(12) United States Patent
Vaporciyan

(10) Patent No.: US 7,067,610 B2
(45) Date of Patent: Jun. 27, 2006

(54) METHOD FOR PRODUCING POLYCARBONATE

(75) Inventor: Garo Garbis Vaporciyan, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/940,181

(22) Filed: Sep. 14, 2004

(65) Prior Publication Data

US 2005/0090638 A1   Apr. 28, 2005

Related U.S. Application Data

(60) Provisional application No. 60/503,040, filed on Sep. 15, 2003.

(51) Int. Cl.
*C08G 64/00*   (2006.01)

(52) U.S. Cl. .................. 528/196; 159/6.1; 159/6.2; 422/131; 526/126; 526/161; 528/198; 585/521

(58) Field of Classification Search ............... 159/6.1, 159/6.2; 422/131; 526/126, 161; 528/196, 528/198; 585/521
See application file for complete search history.

(56) References Cited

U.S. PATENT DOCUMENTS

| | | | | |
|---|---|---|---|---|
| 3,509,094 | A * | 4/1970 | Gemassmer | 528/491 |
| 3,689,462 | A * | 9/1972 | Maxinovich | 528/371 |
| 4,948,871 | A * | 8/1990 | Fukuoka et al. | 528/481 |
| 5,204,377 | A * | 4/1993 | Fukawa et al. | 521/60 |
| 5,320,161 | A | 6/1994 | Iiams | 165/2 |
| 5,543,546 | A | 8/1996 | Tsunkei | 558/270 |
| 5,589,564 | A | 12/1996 | Komiya | 528/196 |
| 5,747,609 | A | 5/1998 | Komiya | 526/68 |
| 5,921,089 | A | 7/1999 | Kleinloh | 62/46.1 |
| 6,277,941 | B1 | 8/2001 | Irifune et al. | 528/20 |
| 6,277,945 | B1 | 8/2001 | Hachiya et al. | 528/196 |
| 6,362,006 | B1 * | 3/2002 | Potyrailo et al. | 436/131 |
| 6,455,732 | B1 | 9/2002 | Aichinger et al. | 562/598 |

FOREIGN PATENT DOCUMENTS

| | | |
|---|---|---|
| JP | 2000/044503 | 2/2000 |
| RO | 117316 | 1/2002 |
| WO | 00/35847 | 6/2000 |

* cited by examiner

*Primary Examiner*—Terressa Boykin

(57) ABSTRACT

An integrated method for producing aromatic polycarbonate, including the steps of:
(1) making a liquid mixture of acetone and diphenylcarbonate;
(2) transporting the liquid mixture of step (1) to a polycarbonate production plant;
(3) separating the diphenylcarbonate from the acetone in the liquid mixture in the polycarbonate production plant;
(4) reacting the diphenylcarbonate with bisphenolacetone to produce polycarbonate, thereby liberating phenol;
(5) reacting phenol of step (4) with acetone of step (3) to produce bisphenolacetone;
(6) using bisphenolacetone of step (5) in the reaction of step (4).

16 Claims, No Drawings

METHOD FOR PRODUCING POLYCARBONATE

This application claims the benefit of Provisional Ser. No. 60/503,040 filed Sep. 15, 2003.

FIELD OF THE INVENTION

The present invention relates to an integrated method for producing an aromatic polycarbonate.

BACKGROUND OF THE INVENTION

Aromatic polycarbonate, further referred to herein as polycarbonate, is a widely used raw material in many different manufacturing sectors. Due to the hardness and transparency of the material, it can be applied in applications as diverse as automotive windows and optical lenses. It is believed that the demand for polycarbonate will increase significantly in the coming years, requiring improvement in the production of polycarbonate, particularly in terms of efficiency and environmental impact.

Several processes for the production of polycarbonate are known. For instance, a process including reacting phosgene and 2,2-bis(4-hydroxyphenyl)propane (commonly known as bisphenolacetone, or BPA) under phase transfer conditions is applied on an industrial scale. However, this process has the inherent drawbacks of employing the toxic component phosgene and creating chloride containing waste streams.

A different process that does not require the use of phosgene is based on the transesterification of bisphenolacetone with dialkyl carbonate or diaryl carbonate.

The dialkyl carbonate has the disadvantage that in the transesterification with bisphenolacetone, it is not reactive enough, so that polymeric polycarbonate cannot be formed. Furthermore, the alkyl alcohol that is liberated is not used in any other part of the process for producing polycarbonate. Recycling of the alkyl alcohol to the dialkyl carbonate production however will require substantial purification.

The use of a diaryl carbonate, in particular diphenyl carbonate (DPC), has the advantage that it is reactive enough to form polymeric polycarbonate. Furthermore, phenol is liberated in the reaction of the diphenyl carbonate with bisphenolacetone to form polycarbonate, for instance as described in U.S. Pat. No. 5,589,564. This phenol may in turn be recycled to the production of bisphenolacetone or diphenyl carbonate, for which it is a main raw material.

The use of the liberated phenol for the manufacture of diphenyl carbonate requires a substantial purification, as described in U.S. Pat. No. 5,747,609. A more efficient approach is thus to employ the liberated phenol for the production of bisphenolacetone, as described in U.S. Pat. No. 6,277,945 without further purification.

All of the above-described processes have in common that large amounts of separate raw materials need to be produced, transported and stored, or that several large production units must be combined on a single production site, which is usually not feasible for environmental and economical reasons.

The above process, which combines the production of bisphenolacetone and polycarbonate, needs as raw materials acetone, phenol and diphenyl carbonate. The latter two are solids at ambient temperature, which implies that if large amounts of these materials are transported, a number of problems arise that affect both the safety and economics of the overall process.

Diphenyl carbonate has a melting point of 78–79° C., which makes a transport in molten state impracticable, as most standard transport vessels for liquid materials are not equipped to maintain a temperature above 70° C. However, safe transport and handling of the molten product (e.g. with minimal waste from tank washings) requires maintaining the product at a temperature of about 15 to 20° C. above the melting point. Transport of liquid materials at such temperature would also require a large amount of energy, and could lead to problems with solidifying material if not properly handled. Only a limited number of vessels are even capable of such proper handling at these temperatures, all with rather smaller tank sizes.

The transport of diphenyl carbonate in the solid state on the other hand requires the diphenyl carbonate to be solidified after its production. This is usually accomplished by cooling the diphenyl carbonate, and by forming it into suitable particles, which can then be bagged and transported as solid material. Generally, cooling and particle formation require large and complicated equipment such as cooling bands and/or prill towers. Such equipment unnecessarily increases the capital investment, and is also expensive and energy consuming to operate.

The handling and transport of solid diphenyl carbonate have drawbacks common to handling of solids in general. For instance, the solid particles have to have a suitable size and size distribution according to their subsequent application, as otherwise the material may not flow freely due to blocking. This size and size distribution are difficult to maintain, as the particles are prone to sinter upon exposure to even moderately elevated temperature and/or pressure. The particles may also build-up electrostatic charges upon handling, which increases the hazard of explosions and fire. A further problem occurs when reheating the diphenyl carbonate particles to obtain a molten product or a solution. This not only consumes much energy, but also can lead to partial degradation and discoloration of the material due to hot spots.

Additionally, contamination with dust during cooling, crushing or transport is difficult to avoid. This may lead to contamination of the polycarbonate, which is detrimental to properties of polycarbonate products, in particular when used in optical devices.

Hence, the above process for production of polycarbonate leaves ample room for improvement, in particular in view of the way the raw materials are introduced.

SUMMARY OF THE INVENTION

The present invention is directed to a method for producing aromatic polycarbonate, including the steps of:

(1) making a liquid mixture of acetone and diphenyl carbonate;

(2) transporting the liquid mixture of step (1) to a polycarbonate production plant;

(3) separating the diphenyl carbonate from the acetone in the liquid mixture in the polycarbonate production plant;

(4) reacting the diphenyl carbonate with bisphenolacetone to produce polycarbonate, thereby liberating phenol;

(5) reacting phenol of step (4) with acetone of step (3) to produce bisphenolacetone;

(6) using bisphenolacetone of step (5) in the reaction of step (4).

DETAILED DESCRIPTION OF THE INVENTION

The subject method resides on the insight that disadvantages and problems with the transport of both molten and solid diphenyl carbonate can be avoided by dissolving diphenyl carbonate in a solvent that is also a raw material required for the manufacture of polycarbonate. This alleviates problems such as removing the solvent from the diphenyl carbonate at the polycarbonate production site, resulting in a potentially contaminated solvent fraction; finding another use for the solvent; or incinerating it.

Acetone is used for the manufacture of bisphenolacetone, which in turn is a raw material for polycarbonate. Theoretically, 1 mole of acetone is required together with two moles of phenol to form 1 mole of bisphenolacetone. In turn, 2 moles of phenol are liberated per mole of diphenyl carbonate reacted with bisphenolacetone to obtain a polycarbonate. Generally, the production of polycarbonate with an integrated production of bisphenolacetone requires about equimolar amounts of acetone and diphenyl carbonate to be present at the polycarbonate factory.

It has now been discovered that acetone is a suitable solvent for diphenyl carbonate, providing the required viscosity reduction at a temperature range of 15° C. to 70° C., which is generally considered as a suitable temperature range for transport and handling. It has further been found that diphenyl carbonate dissolves in acetone in such way that at ambient or slightly elevated temperature, the amount of acetone required to dissolve the diphenyl carbonate is in the molar range required for the manufacture of bisphenolacetone from the liberated phenol. Thus, by using acetone as the solvent for diphenyl carbonate, the subject method permits the combination of two important raw materials of the above process without creating the necessity for returning spent solvent. Furthermore, by this approach, the solidification of diphenyl carbonate, and problems associated with the handling of the solid diphenyl carbonate are avoided.

Additionally, the combination of two important raw materials into a liquid mixture, which otherwise were transported and stored in separate vessels and tanks, reduces the need for storage capacity during transport as well as at the customer site, as separate acetone and diphenyl carbonate tanks are not required.

The exact ratio of acetone to diphenyl carbonate in the liquid mixture will be determined by the requirements of transport and handling as well as by the amount required at the polycarbonate production site. Preferably, the molar ratio of acetone to diphenyl carbonate in the liquid mixture is in the range of from 0.5:1 to 7:1. However, if there is another use for acetone at the polycarbonate site, larger amounts of acetone may be employed for the liquid mixture.

Conveniently, the molar ratio of acetone to diphenyl carbonate is at least in the molar range required to achieve a liquid mixture at the required storage and transport temperature that allows easy handling, for instance at about 1:1 (or above). At this ratio, the liquid mixture can be handled and stored at about 50° C. (or below), a temperature usually considered as normal for the transport of liquids in tank transporters and tank ships.

The molar ratio of acetone to diphenyl carbonate is also determined by the requirements for low viscosity during handling and storage of the liquid mixture. In order to achieve a suitably low viscosity, the molar ratio of acetone to diphenyl carbonate is preferably at least 0.5:1, more preferably at least 0.6:1, again more preferably at least 0.8:1 and yet more preferably at least 0.9:1. On the other hand, the molar ratio of acetone to diphenyl carbonate in the liquid mixture preferably is at most 5:1, more preferably at most 3.5:1, yet more preferably less than 3, again more preferably less than 2.5, and most preferably at most 2:1 in order to achieve a sufficiently low viscosity and good balance between the required amounts of both components in the overall process.

Accordingly, step (1) of the subject method comprises making a liquid mixture of acetone and diphenyl carbonate. This may preferably be performed while the diphenyl carbonate is still liquid at the diphenyl carbonate production site, for instance, by adding the acetone to a stirred vessel containing the liquid diphenyl carbonate, or by adding the liquid diphenyl carbonate to acetone, until the desired acetone/diphenyl carbonate ratio is obtained.

It has been found that in industrial scale bisphenolacetone processes, a slightly higher amount of acetone and of phenol may be required due to undesired by-products that are removed from the process cycle. As a result, the overall process might require additional acetone and phenol, which will have to be transported to, and stored at the customer site, thus complicating the overall process. This additional raw material stream may preferably be avoided by having an additional amount of phenol and acetone present in the liquid mixture as required for the bisphenolacetone process. Accordingly, the liquid mixture of step (1) further contains of from 0 to 10% by weight of phenol, more preferably from 1 to 8% by weight of phenol, yet more preferably from 1.5 to 5% by weight of phenol. Advantageously, the presence of additional phenol may be achieved by not removing all of the phenol during the diphenyl carbonate production. This has the advantage that in the production of diphenyl carbonate, not all of the phenol has to be converted and/or removed, thereby simplifying the process.

Tests have revealed that upon extended storage at the storage temperature range, the diphenyl carbonate and solution properties remain unchanged, provided that the acetone employed was essentially free from water to avoid the hydrolysis of the diphenyl carbonate to phenol and carbon dioxide. Preferably, water should not be present in the liquid mixture in an amount of more than 1.0% by weight. More preferably, the liquid mixture contains from 0 to 0.3% by weight of water. This may be achieved by using acetone containing from 0 to 0.5% by weight of water, more preferably less than 0.5% by weight of water. However, if additional phenol is desired to be present in the liquid mixture, the acetone can preferably contain more water. Care should be taken in this case to avoid too much foaming due to the released carbon dioxide.

Diphenyl carbonate can be produced in a number of ways, including the phosgenation of phenol or the oxidative carbonylation of phenol, both of which involve cumbersome reaction steps and create unnecessary amounts of waste.

Diphenyl carbonate and/or bisphenol acetone according to the subject invention comprise the products of unsubstituted phenol, as well as those of substituted phenols. In particular, brominated phenols have been found to improve the fire resistance of polycarbonate. Accordingly, the diphenyl carbonate and/or bisphenolacetone according to the subject invention may comprise the products of a substituted phenol, in particular, of a brominated phenol.

A process which is more effective due to a more integrated raw material cycle, includes the steps of (i) reacting an olefin (e.g. propylene) and an oxidant to obtain the corresponding alkylene oxide (e.g. propylene oxide), then (ii) reacting the obtained alkylene oxide with carbon dioxide to obtain a cyclic alkylene carbonate (e.g. propylene carbonate), then (iii) reacting the obtained cyclic alkylene carbonate with methanol to obtain DMC and the corresponding alkylene glycol (e.g. propylene glycol), and (iv) reacting the obtained DMC with phenol to obtain diphenyl carbonate, for instance as described in U.S. Pat. No. 5,543,546. The steps (iii) and (iv) advantageously are performed as a reactive distillation.

The freshly produced liquid diphenyl carbonate is preferably immediately dissolved in the acetone, thereby avoiding hot storage of diphenyl carbonate. The liquid mixture may then be stored or transported and shipped without, or with only moderate additional heating, and requires only the customary insulation of transport tanks and piping to avoid substantial heat loss.

In step (2) of the subject method, the liquid mixture of step (1) is transported to a polycarbonate production plant. This transport is performed as commonly applied for liquid chemical products in a bulk transport. The term transport includes storing and moving in suitable transport vessels.

Suitable storage and transport vessels include vessels such as road and rail tankers, bulk containers, tank barges and tank ships, storage tanks, drums and pipelines.

The material of the transport vessels should of course be proof against the liquid mixture and the temperature used. A preferred material is stainless steel.

The storage and transport temperature generally is in the range of from ambient temperature to about 70° C., depending on the relative amounts of diphenyl carbonate and acetone.

If the liquid mixture is transported at elevated temperature, the transport and storage vessels are customarily insulated to reduce heat loss, and equipped with the necessary safety devices required.

At the production site, the liquid mixture may be easily separated into diphenyl carbonate and acetone, which may be directly employed in steps (4) and (5), respectively, of the process of the present invention.

Acetone may be added or partly removed at any stage of the transport or handling, as required. For instance, excessive acetone may be removed during the loading of larger barges, and may be added again when the barge is unloaded in order to achieve a suitable transport viscosity.

In step (3), the diphenyl carbonate is separated from the acetone in the liquid mixture. This separation may conveniently be performed by a distillation treatment. Such a distillation treatment may be performed by a flash unit, or in a continuous distillation column, where the acetone is removed as top product, while the diphenyl carbonate remains in the bottom fraction.

Alternatively, a continuous film evaporator unit may be employed to avoid prolonged exposure of the diphenyl carbonate to elevated temperatures.

The boiling points of acetone and diphenyl carbonate are far enough apart that the obtained acetone is generally sufficiently pure for further use without additional purification. However, if desired a separate purification unit, for instance a distillation column, may be added to further purify the acetone.

Any phenol present in the acetone, which might originate from the thermal degradation of diphenyl carbonate during the separation, or from hydrolysis by water, or which has been added on purpose, requires no removal, as it can participate in the reaction for the production of bisphenolacetone.

The bottom fraction in the distillation unit mainly consists of diphenyl carbonate. It is, however, not required to remove all of the acetone. A small amount of acetone remaining in the diphenyl carbonate fraction may even have beneficial effects in the following steps, while also permitting a reduction in the energy consumption in this separation step (3).

In step (4), the diphenyl carbonate is reacted with bisphenolacetone to produce polycarbonate, thereby liberating phenol, as for instance described in U.S. Pat. No. 6,277,941, which is hereby incorporated by reference. Under the reaction conditions, the liberated phenol may immediately be removed from the mixture, so that no additional removal step is required.

In this step (4), a small amount of acetone, when present in the diphenyl carbonate, helps to reduce the viscosity and melting point of diphenyl carbonate, which improves the handling of the diphenyl carbonate melt.

The presence of a small amount of acetone also has the following beneficial effects on the overall reaction:

It acts as a solvent and/or plasticizer, thereby reducing the melt viscosity and the glass transition temperature of diphenyl carbonate, bisphenolacetone, and the formed polycarbonate. As a result, the melt process may be performed at a lower temperature.

It also improves the mixing of the components, which allows a better control of the molecular weight distribution of the polycarbonate product.

It also assists in the removal of the liberated phenol, thereby acting as an extraction solvent.

Additionally, the removed mixture containing phenol and acetone may be directly employed in the manufacture of bisphenolacetone without further purification.

Accordingly, the diphenyl carbonate fraction obtained in step (3) and used in step (4) preferably still contains at most 3% by weight of acetone, more preferably at most 2%, again more preferably at most 1.5% by weight, yet more preferably, at most 1% by weight by weight of acetone, and most preferably at most 0.5% by weight of acetone.

In step (5), the phenol of step (4) is reacted with the acetone of step (3) to produce bisphenolacetone.

In step (6), the thus obtained bisphenolacetone is used in the reaction of step (4). The use of the bisphenolacetone thereby closes the overall cycle of the process, which permits a hitherto unknown level of integration, thereby making the subject process highly energy efficient as well as making efficient use of all raw materials used, while also reducing the need for separate transport, handling and storage of the raw materials of the overall process.

What is claimed is:

1. An integrated method for producing aromatic polycarbonate, comprising:
   (1) making a liquid mixture of acetone and diphenylcarbonate;
   (2) transporting the liquid mixture to a polycarbonate production plant;
   (3) separating the diphenylcarbonate from the acetone in the liquid mixture in the polycarbonate production plant, producing separated diphenylcarbonate and separated acetone;
   (4) reacting separated diphenylcarbonate with bisphenolacetone to produce polycarbonate, thereby producing liberated phenol;
   (5) reacting the liberated phenol with separated acetone to produce bisphenolacetone;
   (6) using bisphenolacetone of step (5) in the reaction of step (4).

2. The method of claim 1, in which the molar ratio of acetone to diphenylcarbonate in step (1) is in the range of from 0.5:1 to 7:1.

3. The method of claim 1, in which the molar ratio of acetone to diphenylcarbonate in step (1) is in the range of from 0.9:1 to 2:1.

4. The method of claim 1, in which the temperature during step (2) is in the range of from 15° C. to 70° C.

5. The method of claim 1, in which the separated diphenylcarbonate contains at most 3% by weight of acetone.

6. The method of claim 1, in which the liquid mixture further contains from 0% to 10% by weight of phenol.

7. The method of claim 1, in which step (3) is performed using a continuous film evaporator unit.

8. The method of claim 1, in which the diphenylcarbonate used in step (1) is obtained in a reaction comprising the steps of:
   a. reacting an olefin and an oxidant to obtain the corresponding alkylene oxide;
   b. reacting the alkylene oxide with carbon dioxide to obtain a cyclic alkylene carbonate;
   c. reacting the cyclic alkylene carbonate with methanol to obtain dimethylcarbonate and the corresponding alkylene glycol; and,
   d. reacting the dimethylcarbonate with phenol to obtain diphenylcarbonate.

9. The method of claim 8, in which the olefin is propylene, the alkylene oxide is propylene oxide, the cyclic carbonate is propylene carbonate, and the alkylene glycol is monopropylene glycol.

10. The method of claim 8, in which step (3) is performed using a continuous film evaporator unit.

11. The method of claim 8, in which the molar ratio of acetone to diphenylcarbonate in step (1) is in the range of from 0.5:1 to 7:1.

12. The method of claim 8, in which the molar ratio of acetone to diphenylcarbonate in step (1) is in the range of from 0.9:1 to 2:1.

13. The method of claim 8, in which the temperature during step (2) is in the range of from 15° C. to 70° C.

14. The method of claim 8, in which the separated diphenylcarbonate contains at most 3% by weight of acetone.

15. The method of claim 8, in which the liquid mixture of step (1) further contains from 0% to 10% by weight of liberated phenol.

16. The method of claim 8, in which step (3) is performed using a continuous film evaporator unit.

* * * * *